US00RE45681E

(19) United States
(12) Reissued Patent
Perry et al.

(10) Patent Number: US RE45,681 E
(45) Date of Reissued Patent: Sep. 29, 2015

(54) ROBOTIC TOOL COUPLER RAPID-CONNECT BUS

(71) Applicant: ATI Industrial Automation, Inc., Apex, NC (US)

(72) Inventors: Dwayne Perry, Apex, NC (US); Richard I. Heavner, Apex, NC (US)

(73) Assignee: ATI Industrial Automation, Inc., Apex, NC (US)

(21) Appl. No.: 13/998,683

(22) Filed: Sep. 13, 2013

Related U.S. Patent Documents

Reissue of:
(64) Patent No.: 7,328,086
Issued: Feb. 5, 2008
Appl. No.: 11/376,927
Filed: Mar. 16, 2006

U.S. Applications:
(63) Continuation of application No. 10/647,559, filed on Aug. 25, 2003, now Pat. No. 7,027,893.

(51) Int. Cl.
*G06F 19/00* (2011.01)
*B25J 9/16* (2006.01)
*B25J 15/04* (2006.01)

(52) U.S. Cl.
CPC *B25J 9/161* (2013.01); *B25J 15/04* (2013.01); *G05B 2219/31095* (2013.01); *G05B 2219/31142* (2013.01); *G05B 2219/39468* (2013.01); *G05B 2219/49304* (2013.01); *G05B 2219/50338* (2013.01)

(58) Field of Classification Search
CPC ..... H03F 1/54; G01K 7/01; B23Q 1/0009; B23Q 3/1554; B23Q 3/15526; B23Q 5/043; B23Q 17/2233; B44B 3/002
USPC ..... 340/653; 409/186, 230; 483/1
See application file for complete search history.

(56) References Cited

U.S. PATENT DOCUMENTS

| | | | |
|---|---|---|---|
| 3,663,998 | A | 5/1972 | Cupler, II |
| 3,667,114 | A | 6/1972 | Smith et al. |
| 3,787,253 | A | 1/1974 | Ashar |
| 4,398,136 | A | 8/1983 | Tanaka |

(Continued)

OTHER PUBLICATIONS

CNC Automation, Inc., Manufacturers of the system M3X & system M4X CNC controls, 1998, Internet, p. 1-2.

(Continued)

*Primary Examiner* — Christopher E. Lee
(74) *Attorney, Agent, or Firm* — Coats & Bennett, PLLC

(57) ABSTRACT

A tool changer comprising a master module and a tool module includes a rapid-connect communication bus between the master and tool modules. A unique tool identification number, along with other tool-related information, may be transmitted from the tool module to the master module within about 250 msec of the master and tool modules coupling together. The master module includes a robotic system communications network node connected to the rapid-connect communication bus, and operative to transmit data between the tool and the network via the communication bus. The need for a separate network node in the tool module is obviated, reducing cost and reducing the start-up time required to initialize such a network node upon connecting to a new tool. The rapid-connect communication bus may be a serial bus.

18 Claims, 2 Drawing Sheets

(56) References Cited

U.S. PATENT DOCUMENTS

| | | | | | |
|---|---|---|---|---|---|
| 4,764,759 | A | * | 8/1988 | Braun et al. | 340/653 |
| 4,998,206 | A | | 3/1991 | Jones et al. | |
| 5,018,266 | A | | 5/1991 | Hutchinson et al. | |
| 5,636,949 | A | * | 6/1997 | Nakamura et al. | 409/230 |
| 5,906,460 | A | * | 5/1999 | Link et al. | 409/186 |
| 5,974,643 | A | * | 11/1999 | Hays et al. | 29/39 |
| 6,084,373 | A | | 7/2000 | Goldenberg et al. | |
| 6,116,966 | A | | 9/2000 | Little et al. | |
| 6,459,175 | B1 | | 10/2002 | Potega | |
| 6,533,594 | B1 | | 3/2003 | Kurup | |
| 6,840,895 | B2 | * | 1/2005 | Perry et al. | 483/1 |
| 7,239,940 | B2 | * | 7/2007 | Wang et al. | 700/245 |

OTHER PUBLICATIONS

Applied Robotics, Inc. "XC50.1 DeviceNet System, User's Guide 93590R00." Jan. 22, 2001; pp. 1-26; Applied Robotics, Inc., Glenville, NY.

Applied Robotics, Inc. "Omega 3.1 DeviceNet System User's Guide 93591 rev 04." Jan. 14, 2002; pp. 1-51; Applied Robotics, Inc., Glenville, NY.

Applied Robotics, Inc. "Sigma DeviceNet Tool Change System User's Guide 94018 Rev 02." May 17, 2003; pp. 1-19; Applied Robotics, Inc., Glenville, NY.

Applied Robotics, Inc. "Sigma Device Net Module User's Guide # 94018 Rev 00." 2003; pp. 1-15; Applied Robotics, Inc., Glenville, NY.

* cited by examiner

ROBOTIC TOOL COUPLER RAPID-CONNECT BUS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*This application is a continuation of, and claims priority to, U.S. patent application Ser. No. 10/647,559, now U.S. Pat. No. 7,027,893, entitled "Robotic Tool Coupler Rapid-Connect Bus," filed Aug. 25, 2003.*

BACKGROUND

The present invention relates generally to the field of robotics and specifically to a rapid-connect communication bus between the master and tool modules of a robotic tool coupler.

Industrial robots have become an indispensable part of modern manufacturing. Whether transferring semiconductor wafers from one process chamber to another in a cleanroom or cutting and welding steel on the floor of an automobile manufacturing plant, robots perform many manufacturing tasks tirelessly, in hostile environments, and with high precision and repeatability.

In many robotic manufacturing applications, it is cost-effective to utilize a relatively generic robot to accomplish a variety of tasks. For example, in an automotive manufacturing application, a robot may be utilized to cut, grind, or otherwise shape metal parts during one production run, and perform a variety of spot welding tasks in another. Different welding tool geometries may be advantageously mated to a particular robot to perform welding tasks at different locations or in different orientations. In these applications, a tool changer is used to mate different tools to the robot. One half of the tool changer, called the master module, is permanently affixed to a robot arm. The other half, called the tool module, is affixed to each tool that the robot may utilize. When the robot arm positions the master module adjacent the tool module connected to a desired tool, a coupler is actuated that mechanically locks the master and tool modules together, thus affixing the tool to the end of the robot arm. Utilities such as electrical current, air pressure, hydraulic fluid, cooling water, electronic or optical data signals, and the like, may be transferred through the robot changer from the master module to the tool module via mating terminals, valve connections, electrical connectors, and the like, making the utilities available to the selected tool. Tool changers and their constituent couplers are well known in the robotics arts, and are commercially available, such as from the assignee, ATI Industrial Automation of Apex, N.C.

In sophisticated robotic environments, one or more central controllers monitor and control some or all aspects of the robots' operations. To perform these monitoring and control functions, the controllers are typically connected to a robotic system communications network. One example of such a network is the DeviceNet specification promulgated by the Open DeviceNet Vendor Association (ODVA), information on which is available from odva.org. Alternatively, other network and/or point-to-point data communications system known in the art may be used. A typical robotic system communications network, such as DeviceNet, defines a plurality of nodes having specified functionality and capability, a physical connection and data communication specification, and a set of logical and operational protocols to effect orderly operation of the network and data communications between and among its nodes.

Particularly in applications where a variety of tools are utilized by a given robot in succession during an operation or sequence of operations, bringing each tool "on-line" quickly is of paramount concern. In this context, bringing a "new," i.e., newly attached, tool "on-line" may comprise identifying the tool by reading a unique tool ID and/or tool function or class code; initializing the tool by providing configuration and/or calibration data, instructions, or the like; monitoring various parameters associated with the tool, such as the state of various safety interlock switches; and similar functions. One or more of these or other initialization functions are typically required prior to the tool being used to perform its task.

Typically, to accomplish this communication between the tool and the central controller or other nodes on the robotic system communications network, a network node is provided in the robotic coupler tool module that is attached to the tool. Upon attaching the tool to the robot by coupling the master module to the tool module, electrical power and other services are provided to the tool module and to the tool, and the tool module robotic system communications network node initializes and begins communicating with the network. This process may be lengthy, such as on the order of eight to ten seconds or more, which time is "idle" with respect to the robot performing useful work. Even if improvements to the network protocols and/or network node specifications reduce this start-up time, the provision of a fully functional network node on each tool module (hence, one per tool), is expensive and inefficient.

SUMMARY

The present invention relates to a robotic tool changer with a rapid-connect communication bus. The tool changer includes a master module having a robotic system communications network node, and a communication bus between the master module and the tool module. The tool module may not include a network node. Data communications between the network and the tool module and/or a tool may be accomplished by communication between the network and the master module network node, with the master module network node providing further communications with the tool module and the tool via the communication bus. In one embodiment, the communication bus may comprise a serial bus.

DETAILED DESCRIPTION OF THE INVENTION

Figure 1:
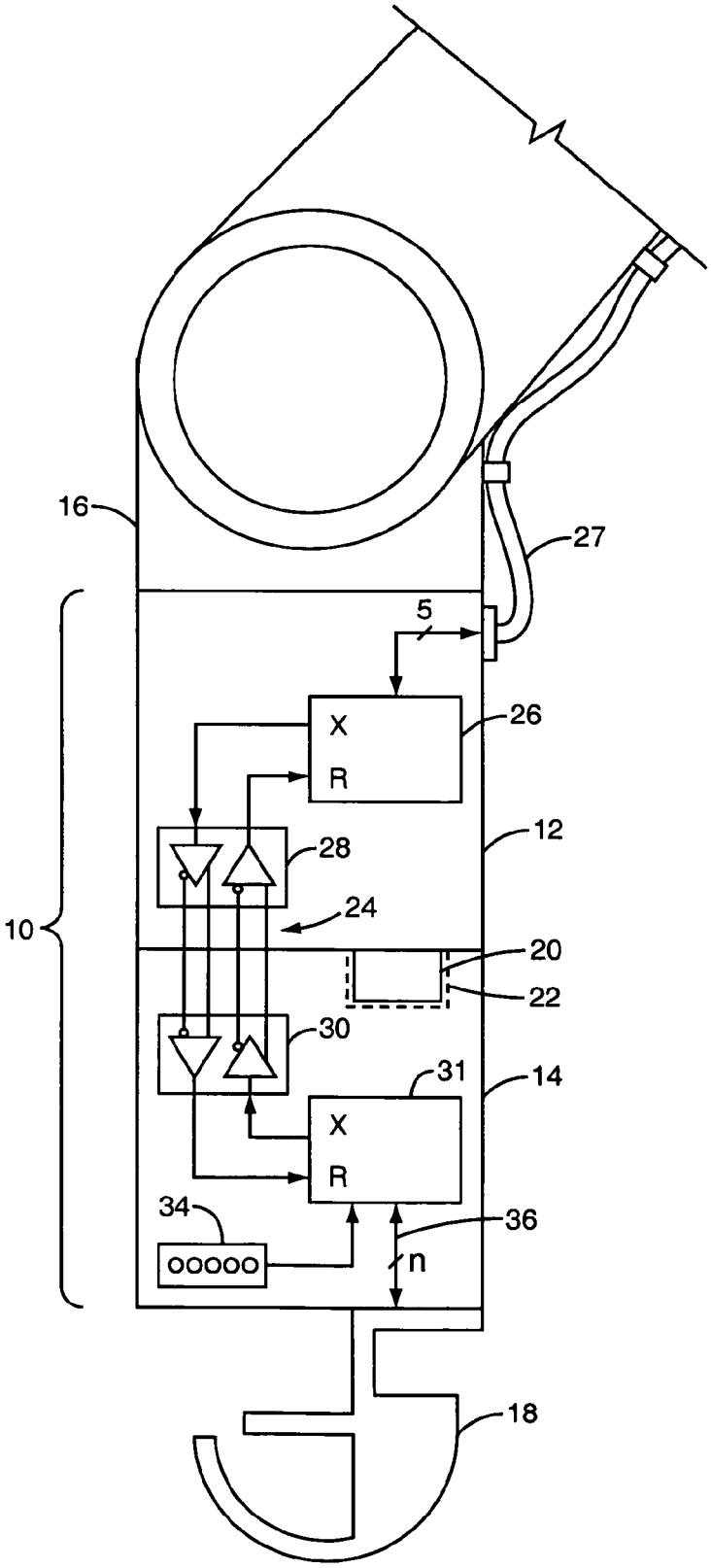
FIG. 1 is a functional block diagram of a robotic system depicting a rapid-connect communication bus according to one embodiment of the present invention.

FIG. 1 depicts a functional block diagram of the tool changer 10 of the present invention. The tool changer 10 comprises a master module 12 and tool module 14. The master module 12 is affixed to a robot arm 16, and the tool module 14 is affixed to a tool 18, such as the welding gun depicted in FIG. 1. In practice, a separate tool module 14 is typically attached to each of a wide variety of tools 18. The tool changer 10 increases the versatility of the robot 16 by providing a standard interface to the variety of tools 18, allowing different tools 18 to be quickly attached to the robot 16. The tool changer 10 attaches tools 18 to the robot 16 by coupling the master module 12 and tool module 14 together via coupler 20, which may extend from the master module 12 into a mating recess 22 in the tool module 14. The coupler 20 may be actuated via an electro-mechanical, pneumatic, hydraulic, or other mechanism, as is well known in the robotic arts.

In addition to providing a physical connection between the robot 16 and a tool 18, the tool changer 10 transfers a variety of utilities, such as electrical current, air pressure, hydraulic fluid, cooling water, electronic or optical data signals, and the like, through the robot changer from the master module 12 to the tool module 14 via mating terminals, valve connections, electrical connectors, and the like (not shown).

The master module 12 includes a robotic system communications network node 26. In one embodiment, the master node 26 conforms to the DeviceNet protocol and specification. The master node 26 connects to the robotic system communications network via cable 27, which may for example comprise the two data lines, two power lines, and signal ground of the DeviceNet specification. The master node 26 may be implemented as a stored-program microprocessor, such as an 8051-type microcontroller, programmed to comply with the robotic system communications network specification and protocol for network nodes. Alternatively, the network node 26 may be implemented in hardware, such as with an ASIC, FPGA, or circuit board comprising discrete components.

In order to verify that the proper tool is attached, robot control systems typically require that an identification number, or tool-ID, be read from each tool 18 immediately upon attaching the tool 18 to the robot arm 16, or as soon thereafter as possible. The tool-ID may be unique to each tool, or alternatively may indicate a class or type of tool. The tool-ID information may be passed directly from the tool module 14 to the master module 12 through a large number of electrical connections, typically twenty connections for a five-digit tool-ID. Such a large number of electrical connections may add undesirable weight, cost, and complexity to the tool changer 10. To reduce the number of connections, tool changers typically provide a network node, similar to the master module network node 26, in the tool module 14. In this case, signals from the network bus 27 are typically routed across the master/tool interface for connection to the tool module network node. The tool module network node circuit, following a lengthy process that may include booting up and loading the network node software, verifying its network address with the system, and the like, would then read the tool-ID, such as from a set of switches 34, and provide this information on the robotic system communications network.

According to the present invention, a rapid-connect communication bus, indicated generally at 24, is connected between the master module 12 and the tool module 14. As used herein, the term "between" means that the communication bus 24 comprises two nodes or terminals (as described below) and provides communications directly from the tool module to the master module, or vice versa, without data or network arbitration passing through a third bus node to effect the transfer between master and tool modules. The communication bus 24 is characterized by its ability to begin data transfer (in particular, from the tool module to the master module) very rapidly following connection of the master module 12 to the tool module 14. The bus 24 both avoids the excessive number of connections required for direct transfer of tool-ID or other information between the tool module 14 and the master module 12, and also obviates the need for a tool module network node, dramatically reducing the start-up time necessary to provide a tool-ID to the robotic system communications network following attaching a new tool 18 (and hence, new tool module 14) to the robot 16 (and attached master module 12). The tool-ID, and other information, may instead by transferred via the communication bus 24 to the master module network node 26, and broadcast to the robotic system communications network from there.

In an exemplary embodiment depicted in FIG. 1, the rapid-connect communication bus 24 is implemented as a serial bus. In this embodiment, the serial port input and outputs of the module network node 26 (such as for example, an 8051-type microcontroller) are utilized to transmit and receive serial data across the communication bus 24. The serial port transmit and receive data lines are connected to a bi-directional differential driver 28, and the differential data lines transferred across the master/slave interface of tool changer 10 by connectors (in addition to existing electrical connections as part of the utility services described above). The differential data lines are connected in the tool module 14 to a second bi-directional differential driver 30, and the transmit and receive data signals are connected between the driver 30 and a tool module serial bus controller 31. Although not depicted in FIG. 1, a variety of other signals may connect the module network node 26 (or other master module communication bus controller circuit) to the tool module bus controller 31, such as a clock, voltage reference signal(s) such as ground, a data qualifying strobe, a R/W directional signal, and the like, as are well known in the digital communications art.

In the exemplary embodiment depicted in FIG. 1, the serial bus 24 complies with the Electronics Industry Association (EIA) serial bus protocol RS-485, an asynchronous, bi-directional serial bus comprising two data lines. Alternatively, within the scope of the present invention, the communication bus 24 may be implemented as a serial bus that complies with RS-232, RS-432, RS-422, the Inter-Integrated Circuit (IIC) serial protocol developed and promulgated by Philips, or any other industry-standard or custom-defined serial data communication protocol.

As will be readily appreciated by one of skill in the art, the rapid-connect communication bus 24 according to the present invention is not restricted to a serial bus. A broad variety of serial or parallel data transfer formats may be utilized, within the broad practice of the present invention. In one embodiment, the communication bus 24 may comprise any number of data lines, and includes a clock signal (not shown). The clock is a periodic reference timing signal that controls operation of the bus in a synchronous fashion, as is well known in the art. In all such embodiments, the communication bus 24 spans between the master module 12 and tool module 14, and provides rapid-connect communications between controllers, or nodes, within the master module 12 and tool module 14. Bus 24 controllers or nodes (such as the master module network node 26 and tool module serial bus controller 31 depicted in FIG. 1) may additionally connect to, and participate in, other buses or networks. As one example, the master module network node 26 participates in a robotic system communications network via cable 27. As another example, in some embodiments the tool module serial bus controller 31 may connect to and participate in other buses, such as a serial bus that communicates with a plurality of tool sensors or actuators. Such additional bus or network connections do not alter the fact that the communication bus 24 connects between the master module 12 and tool module 14, providing data communications directly between those units.

The tool module bus controller 31 may comprise a stored-program microprocessor, or a hardware controller implemented as an ASIC, FPGA, or discrete component circuit, as known in the art. In an exemplary embodiment, the tool module bus controller 31 may be implemented as an 8051-type microcontroller. The tool module bus controller 31 is connected to a tool-ID unit 34, depicted in FIG. 1 as a unit comprising five rotary switches, which may be provided on the exterior of the tool module 14 for setting a unique tool-ID code. Alternatively, the tool-ID unit may comprise any array of switches, blown fuses in a PAL or PLD, magnetic or optical sensor operative to read a tool-ID from an attached tool 18, or the like, as well known in the art.

The tool module bus controller 31 is operative to read the tool-ID from the tool-ID unit 34, and transmit the tool-ID across the communication bus 24 to the robotic system communications network node 26 in the master module 12. The network node 26 may then transmit the tool-ID across the robotic system communications network, obviating the need for a network node in the tool module 14. Additionally, the tool module bus controller 31 may be operative to provide other information to the network node 26, such as safety interlock switch status, and/or data from an attached tool 18. Sufficient I/O may be provided on the tool module communication bus controller 31, and connectivity across a tool information bus 36, to implement the desired communication capability.

In operation, when the robot 16 connects to a new tool 18, the master module 12 of the tool changer 10 that is attached to the robot arm 16 couples to the tool module 14 attached to the tool 18, and locks the two together. At this time, electricity (along with other utilities) is provided to the tool module 14 and the tool 18. The tool module communication bus controller 31 initializes quickly. The speed of initialization depends on the implementation. For example, if the tool communication bus module 31 is implemented as a microcontroller, a short firmware initialization sequence may be required following the application of power, which in some cases may impose up to a quarter second delay between coupling and data transmission. Alternatively, for example if the bus module 31 is implemented as an FPGA or microcontroller with minimal overhead, the time from coupling to data transmission may be much shorter, such as in the range from about 10-100 msec. In other implementations, such as for example an ASIC, PAL or discrete component implementation, the bus module 31 may be virtually instantaneously functional, imposing a delay between coupling and data transmission of less than about 1 msec.

As part of an initialization routine, or alternatively in response to a request from the robotic system communications network node 26 in the master module 12, the tool module bus controller 31 transmits the tool-ID (read from the tool-ID unit 34) across the communication bus 24 to the master module network node 26. Additional information relating to the tool module 14 and/or the tool 18 may additionally be transmitted across the communication bus 24, either from the tool module 14 to the master module 12 or vice versa. In this manner, both the considerable delay associated with booting and initializing a robotic system communications network node, and the cost of providing a fully functional network node and connecting it to the network are avoided, resulting in more economic tool modules 14 and reducing the "down time" associated with each tool change by the robot 16.

Figure 2A:
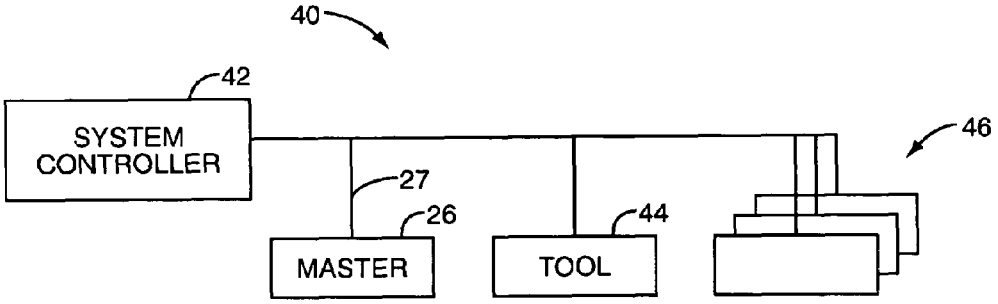
FIG. 2A (PRIOR ART)
FIG. 2A is a diagram of the topology of a prior art robotic system communications network.

A diagram depicting the typical prior art the relationship of elements of the robotic system communications network, indicated generally at 40, is depicted in FIG. 2A. As described, the network 40 comprises a system controller 42, connected via cable 27 to a plurality of network nodes, such as the above-described master module network node 26. The network 40 additionally connected to a tool module network node 44, which powered up as the master module 12 connected to the tool module 14. The network 40 may additionally connect to other nodes 46, which may for example be located in other robotic tool changers.

Figure 2B:
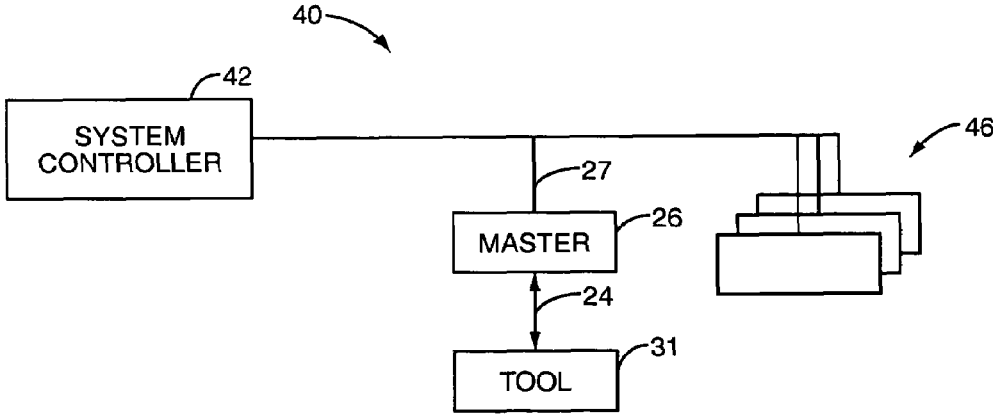
FIG. 2B is a diagram of the topology of a robotic system communications network according to the present invention.

The topology of the robotic system communications network 40 according to the present invention is depicted in FIG. 2B. In this configuration, the tool module network node 44 is omitted, and the tool module 14 (and optionally the tool 18) communicates with the system controller 42 (or other network nodes 46) through the master module network node 26. Information is transferred between the tool module serial bus controller 31 and the master module network node 26 via rapid-connect communication bus 24. According to the present invention, the tool module 14 (and tool 18) are disconnected from, and form no direct part of, the robotic system communications network 40.

Although the present invention has been described herein with respect to particular features, aspects and embodiments thereof, it will be apparent that numerous variations, modifications, and other embodiments are possible within the broad scope of the present invention, and accordingly, all variations, modifications and embodiments are to be regarded as being within the scope of the invention. The present embodiments are therefore to be construed in all aspects as illustrative and not restrictive and all changes coming within the meaning and equivalency range of the appended claims are intended to be embraced therein.

What is claimed is:

1. A robotic tool changer for an industrial robot communicatively coupled to a robotic system communication network, comprising:

a master module mechanically connected to an industrial robot arm and providing a first mechanical interface, the master module including a network node;

a tool module mechanically connected to a robotic tool and operative to mate with the first mechanical interface, the tool module not including a network node; and a communication bus operative to transfer tool data from the tool module to the master module when the master and tool modules are mechanically coupled together.

2. The robotic tool changer of claim 1 wherein the robotic system communication network is a Device Net network.

3. The robotic tool changer of claim 1 wherein the tool changer communicates tool data from the master module, across the robotic system communication network, to a controller node.

4. The robotic tool changer of claim 3 wherein the tool changer communicates tool data to the controller node within about 100 msec. after the master and tool modules couple together.

5. The robotic tool changer of claim 4 wherein the tool changer communicates tool data to the controller node within about 10 msec. after the master and tool modules couple together.

6. The robotic tool changer of claim 5 wherein the tool changer communicates tool data to the controller node within about 1 msec. after the master and tool modules couple together.

7. The robotic tool changer of claim 1 wherein the communication bus is a serial bus.

8. The tool changer of claim 1 wherein the communication bus comprises at least one data line.

9. The tool changer of claim 8 wherein at least one data line is differentially driven.

10. The tool changer of claim 8 wherein the communication bus further comprises at least one clock line.

11. A method of communicating information between a tool module of an industrial robotic tool changer and a controller node of a robotic system communication network, comprising:

mechanically coupling the tool module to a master module of the tool changer, the master module including a robotic system communication network node;

transferring tool information from the tool module to the master module via a communication bus between the master and tool modules; and communicating the tool information from the master module to the controller node via the robotic system communication network.

12. The method of claim 11 further comprising reading the tool information from a tool attached to the tool module.

13. The method of claim 11 further comprising reading the tool information from one or more switches disposed on the tool module.

14. The method of claim 11 further comprising communicating system information directed to the tool module from the robotic system communication network to the master module; and supplying the system information from the master module to the tool module via the communication bus.

15. The method of claim 14 further comprising supplying the system information from the tool module to a tool attached to the tool module.

16. The method of claim 11 wherein the tool module does not include a robotic system communication network node.

17. A tool module of an industrial robotic tool changer, comprising:

a coupling mechanism operative to mechanically couple the tool module to a master module of the robotic tool changer, the master module having a robotic system communication network node;

a communication bus operative to transfer tool data from the tool module to a network node in the master module when the master and tool modules are mechanically coupled together; and wherein the tool module does not include a robotic system communication network node.

18. The tool module of claim 17 further comprising at least one switch providing tool data.

* * * * *